United States Patent Office 3,600,297
Patented Aug. 17, 1971

3,600,297
PREPARATION OF EASILY SEPARABLE ADDUCTS IN THE DEPARAFFINATION OF HYDROCARBONS WITH UREA
Hermann Franz, Neu-Isenburg, Bertold Fritz, Koppern, Taunus, and Max Kunert, Frankfurt am Main-Fechenheim, Germany, assignors to Edeleanu Gesellschaft mbH, Frankfurt am Main, Germany
No Drawing. Filed June 6, 1968, Ser. No. 734,886
Claims priority, application Germany, June 13, 1967, E 34,172
Int. Cl. C07b 21/00
U.S. Cl. 208—25
10 Claims

ABSTRACT OF THE DISCLOSURE

Improvements in the process for the preparation of granular, readily separable adducts of paraffin and urea in the deparaffination of hydrocarbon oils with urea by direct heat exchange of the temperature of the adduct mixtures formed utilizing as the direct heat exchange medium and/or oil solvent vapor introduced directly into the reaction mixture, with the heat of condensation of said steam and/or oil solvent vapor producing the required temperature elevation.

This invention relates to a process for the preparation of granular, radily separable adducts of urea with straight-chained paraffinic hydrocarbons. More particularly, this invention relates to a process for deparaffinating petroleum distillates by forming adducts of urea with straight-chained paraffinic hydrocarbons. The term petroleum distillates, as used herein and in the following, is illustrated by, for example, kerosene, diesel oil, light and heavy gas oil, spindle oil.

It is known that solid complex compounds conventionally referred to as adducts are formed by urea with straight-chained paraffinic hydrocarbons. On this basis, processes have been developed in the petroleum industry for deparaffinating distillates with the object of obtaining oils having low pour-points and pure normal paraffins.

In place of solid urea, it has been found preferable to use highly saturated solutions of urea in water or methanol in the presence of an oil solvent at a reaction temperature of 20 to 40° C. Upon intense agitation, the urea forms with the paraffin present in the distillate, a solid adduct which can be separated by filtration from the remaining liquid reaction mixture. The separated adduct is thereafter dissociated at high temperature by the addition of water thereto into a urea solution and paraffin components, and this two-phase mixture is then separated. Paraffin and oil having a low pour point are the end products of the process.

The solid adduct which has been formed can be recovered from the process as an emulsion-like slurry, as a fine powder, or as a granular product, depending on the conditions observed during the process. In the case of the first two instances, the separation of the adduct from the mixture of oil and oil solvent is very difficult, if not actually impossible, and at the least requires highly effective separating apparatus, such as, for example, ploughing centrifuges. In the case of a granular product, the separation can be carried out by means of simple sieves. Washing in this latter instance is also more effective because of the high filtering action of the granular state. In a technical installation, therefore, the formation of a granular adduct is always to be desired. At the same time, however, care has to be taken to ensure that the granular adduct is not produced in too coarse a form, as it can then include non-paraffinic components which contaminate the paraffin end product. It also has to be ensured that the granular porduct does not become too soft and greasy, as it thereby acquires poor filtering characteristics.

The formation of a granular adduct of high quality which can be sifted through a sieve depends, however, on many factors all of which must be coordinated with one another.

It has already been proposed to use highly saturated urea solutions containing 10 to 40% by weight of water, and preferably containing 24% of water for the formation of the adduct. The latter figure corresponds to a urea solution that is saturated at 70° C. This procedure has the advantage of producing solid granules of the adduct of different size, which simultaneously absorb all of the water from the urea solution, so that only one solid phase is formed, which constitutes the adduct containing the urea solvent, and only one liquid phase, which constitutes the mixture of deparaffinated oil and oil solvent.

It is also known that a number of other factors affect the formation of the adduct granules, such as:

(a) the conditions created by the characteristics of the distillate that is used and by the requirements of the final product.
(b) the selection of the oil solvent.
(c) the quantity of urea solution.
(d) the temperature at which the adduct forms.

In the industrial plant, when using urea solution, the aqueous urea solution preferably with a 70° C. saturation (approximately 24% $H_2O$ and 76% urea) is pumped with a temperature of about 80° C. into the first reaction vessel. The quantity of urea required depends on the quantity of the oil fractions capable of forming adducts. This quantity is determined analytically before the start of the deparaffination procedure. In general there are used three times the amount of urea. Simultaneously with the introduction of the urea solution, there are introduced into the reaction vessel the oil to be deparaffinated for instance spindle oil distillate, and the oil solvent, preferably a chlorinated hydrocarbon. Examples of suitable chlorinated hydrocarbons are chloroform, dichlorethane, butylchloride, carbon tetrachloride, trichloroethane and methylene chloride, the use of the latter being particularly advantageous. The quantity of oil solvent referred to the quantity of oil used is between 100–300% by volume. The formation of the adduct takes place with intense agitation at temperatures of preferably between +25° C. and +35° C., the temperature being regulated by pumping off the low-boiling oil solvent. With the formation of the adduct in the liquid phase, there is obtained the solid, i.e., adduct phase which contains firmly bound the unused squeous urea solution.

It is advantageous to introduce as two portions the total quantity of urea which is to be added. A urea solution of 120% by volume is divided, for instance, into two portions and only 80% by volume is introduced into the first reaction vessel. The remaining 40% by volume are introduced into the second reaction vessel into which the reaction mixture has been transferred from the first reaction vessel following a reaction time of about 10–30 min. The temperature in the second reaction vessel is about 1–2° C. below the temperature in the first reaction vessel. The time of stay in the second reaction vessel is approximately the same as the time of stay in the first reaction vessel.

The adduct obtained after the completion of the reaction in the first and second reaction vessels is a fine crystalline product and therefore difficult to screen off. It is now converted in a conversion means which is a container into a readily screenable granular adduct having a particle size of more than 0.1 mm. and preferably within the range of 0.1 to 0.6 mm. The formation of the granular adduct of this particle size is effected by addition of water which is then stirred together with the mixture consisting of adduct, deparaffinated oil and oil solvent.

This stirring of the mixture with the added water is, on the one hand, essential for the favorable course of the formation of the granules. On the other hand, this stirring is difficult, since the mixture which is to be stirred with the water is very heterogeneous and contains components which are not miscible with water. Accordingly, it is necessary to employ in the mechanical stirring involving a mechanical agitator of a circulating pump which withdraws a lateral stream from the bottom of the regeneration vessel and pumps it back into the conversion means at a higher point.

The temperature in the conversion means remains approximately the same as that in the first and second reaction vessels. The time of stay of the adduct in this conversion means amounts to 10 to 30 minutes. The quantity of water added detremines approximately the particle diameter of the adduct.

However, there are limits to the regulating of the formation of the grain by addition of water by this method which appears so simple. In addition to the aforementioned disadvantage of the difficulty of agitation, there are also other disadvantages and undesired accompanying phenomena.

These will be described by means of the following illustrative examples:

(1) The addition of water gives rise to what practically amounts to a reduction of the original saturation (S) of the urea solution used, which was, for example, S 70° C., and has been reduced to S 60° C. The added amount of water must be evaporated following the dissociation of the adduct into paraffin and urea solution, in order to restore the concentration of the initial urea solution. The costs necessitated for this additional energy make this technique unsuitable for commercial applications.

Further, due to the reduction in the saturation, the granular product which is formed contains more water and urea solution (mother liquor) of low saturation, which render the product soft and often mushy. This not only makes the filtering characteristics poorer, but additionally a portion of the aqueous mother liquor is separated from the adduct grains in the filtration and washing of the adduct grains and acts to contaminate the oil filtrate by the formation of an aqueous phase. Furthermore, the urea which is precipitated from this urea solution when it is cooled clogs the filters and drainage lines.

(2) If the water is not sufficiently mixed with the adduct powder, either due to poor distribution of the water being charged or due to too short a time of stay, the grain size can exceed the desired limits, and, in addition to adduct with the desired grain size, non-siftable powder develops along with coarse grit having a diameter of several millimeters which contains relatively large amounts of non-paraffinic hydrocarbons.

(3) The adaptation and regulation of the required amount of water to the often variable conditions of the process is often very tardy and slow.

In order to prevent these evident disadvantages, it has often been found to be more advantageous to apply a temperature increase after the reaction instead of adding water, as an increase in temperature also results in a conglomeration of the finely crystalline powder into a siftable grit. Generally an increase of a few degrees, i.e., three to ten degrees C., for example, suffices to produce an easily filtrable granular adduct.

An increase in the temperature of the mixture following the adduct formation reaction, however, has been technically impossible until now, as indirect heat transfer by means of heat exchangers cannot be used in a 2-phase system consisting of solid and liquid components.

In accordance with the invention, it has now been found that the temperature of the mixture following the completion of the adduct formation reaction can be realized in a technically simple and economically feasible manner by directly introducing into the reaction mixture the amount of heat necessary for the temperature increase thereof, (1) by the injection of steam and/or
(2) by the injection of vapor of the oil solvent, the temperature increase being regulated by the quantity of vapor or steam that is injected.

The vapors transfer thermal energy to the mixture contained within the conversion means more uniformly than could ever be obtained by means of a heat exchanger. The condensate also distributes itself uniformly in the mixture.

A suitable point for the blowing-in of the vapors is the pressure side of the aforementioned circulating pump. However, it has been found particularly advantageous to blow the vapors directly into the conversion means, for instance at its bottom. By this measure, there is not only obtained a particularly uniform distribution of the heat fed with the vapor and of the condensate, but, in addition, such an intensive mixing action that the circulating pump can be done away with.

The very finely divided steam condensate produces a uniform addition of only very small quantities of water onto the solid adduct particles while the condensate of the oil solvent increases the dilution of the mixture of oil and oil solvent, but it does not change the concentration of the urea solution nor the water content in the adduct.

Due to the heat transmitted by the vapor and the local heating of the adduct particle surfaces caused in this manner, a conglomeration of the fine adduct particles into coarser particles is brought about by cohesion. The temperature of the mixture at the same time remains below the temperature that would be necessary if the mixture had to be heated by indirect methods for the formation of granular adduct to take place.

The range of grain sizes produced by this measure can be kept within very narrow limits. The adduct grains which are thereby formed are hard and strong and, since the moisture content is changed only negligibly by steam or not at all by the solvent vapor, as for instance, methylene vapor, the granular product does not yield any mother liquor in the filtration process. Depending on the dimensions of the granular adduct, the same does not include any oil components.

The grain size regulation can be more rapidly adapted to the frequently variable conditions in a deparaffination apparatus. Since steam is always available in the technical installations, and since solvent vapor, i.e., methylene chloride vapor is produced by the superheating from the vapors of the evaporators, these measures can easily be carried out and can be achieved in existing installations.

The conversion of the finely crystalline adduct powder to a siftable adduct grit by temperature elevation can also be achieved by adding small quantities of water to the mixture as well. Since in this case the amount of water that is added can be kept small, the softening of the grains, such as generally occurred when the addition of water alone is used, can be prevented.

The granular adduct produced by the process of the invention which is still present even after the treatment in the conversion means, as a mixture with deparaffinated oil and oil solvent, is separated from the latter by means of screens. In an evaporator stage, the deparaffinated oil is freed from the oil solvent and the recovered oil solvent is recycled. The adduct which has been removed passes into the decomposer into which so much water or steam is added that the saturation of the urea solution (mother liquor) bound to the adduct grain is reduced to S 60° C. Upon heating to 80–90° C., the adduct decomposes into aqueous urea solution and paraffin component. The aqueous urea solution is then separated from the paraffin component.

The separated aqueous urea solution, as a result of the water added in the decomposer, has a saturation which is too low for formation of adduct. The urea solution must therefore be concentrated before it is recycled. This concentration is carried out in the vicinity of the saturation temperature. If it is desired, for instance, to obtain a urea solution having a saturation S 70° C., the evaporation is carried out at 70–75° C. A vacuum is preferably applied to the concentrator.

The advantages of grain agglomeration by the measures of the process of the invention involving the direct elevation of the temperature of the reaction mixture will be shown in the following examples. The examples are illustrative however, and are not to be construed in limitation of the invention.

The following starting quantities are taken as the basis for the deparaffination of spindle oil distillate:

8.5 parts by weight of a spindle oil distillate having a paraffin content of 20% by weight, 11.8 parts by weight of aqueous solution of urea, saturation 70° C., 26.5 parts by weight of methylene chloride as oil solvent.

The formation of the adduct is carried out as described above in reacting vessels at a temperature of 30° C.

For the formation of the granules, 0.7 part by weight of water are introduced, in accordance with known methods, into the conversion means at a constant temperature. The concentration of the urea solution is reduced from S 70° C. to S 60° C. In this way, there are formed soft, poorly screenable grains the diameters of which lie within the wide range of 0.1 to 2 mm. This wide range of dispersion is due to the insufficient mixing of the added water.

In contradistinction to this, the grain formation in accordance with the invention results in substantially improved granules.

EXAMPLE 1

0.16 part by weight of steam was injected at 2.5 atm. gauge into the conversion means. In this connection, the temperature was increased to 34° C. and the saturation of the urea solution reduced by only 3° C., namely from S 70° C. to S 67° C. The adduct grains which were obtained were hard and very readily screenable. Their diameter fell within the narrow range of 0.1 to 0.6 mm.

The steam can also be injected on the pressure side of the aforementioned circulating pump which is connected with the conversion means. However, it is more advantageous to inject the steam directly into the regeneration vessel. In such case, it eddies the content of the regeneration vessel so intensively that the circulating pump is no longer needed.

EXAMPLE 2

1.14 parts by weight of methylene chloride vapor of 3.5 atm. gauge were injected directly into the conversion means. No circulating pump was required. In this connection, the temperature was increased to 35° C. The saturation of the urea solution remained unchanged. The adduct grains which were obtained had the same desirable properties as those of Example 1.

The following quantities of charge are taken as basis for the deparaffination of a diesel fuel distillate:

8.5 parts by weight diesel fuel distillate having a paraffin content of 22% by weight, 14.2 parts by weight aqueous urea solution, saturation 70° C., 33.3 parts by weight methylene chloride as oil solvent.

The formation of the adduct was carried out as described above in reaction vessels at 26 to 28° C.

For the formation of the granules 0.2 to 0.5 part by weight of water were added, depending upon the boiling point of the distillate, in the conversion means in accordance with the conventional method. Soft, poorly screenable grains were thereby formed the diameters of which lie within the extremely wide range of 0.1 to 5 mm. In this case also, the wide range of dispersion was due to the fact that a uniform mixing of the added water is impossible.

In this instance also a considerably better quality granule was obtained when the formation of the granules was carried out in accordance with the invention.

EXAMPLE 3

0.19 part by weight of steam at 2.5 atm. gauge was injected directly into the conversion means. The mixture was sufficiently eddied and circulate about as a result that no circulating pump was required. The temperature was increased to 30° C. and the saturation of the urea solution was again reduced only to S 67° C. The resultant adduct granules were hard and very readily screenable. Their diameter lay within the narrow range of 0.1 to 0.6 mm.

EXAMPLE 4

Without the use of a circulating pump, 1.36 parts by weight of methylene chloride vapor at 3.5 atm. gauge were injected directly into the conversion means. The temperature was thereby increased to 31° C. and the saturation of the urea solution remained unchanged. The adduct granules obtained had the same good properties as those of Example 3.

The adduct granules obtained in Examples 1 to 4 were separated in the manner described above from the deparaffiinated oil and the oil solvent by screening. The deparaffinated oil is freed from the oil solvent in the manner described above. The oil solvent was returned to the process. The adduct granules which were removed were then split as described above into paraffin and urea solution, the latter, after concentration, being also recycled.

What is claimed is:

1. In the process of separating paraffins from hydrocarbon oils by adding urea or a urea solution to a hydrocarbon oil containing such paraffins and an oil solvent whereby to form granular adducts of said paraffins and said urea in said hydrocarbon oil; filtering off said granules therefrom; and decomposing said adduct granules by heating and treating such with an amount of water and/or steam sufficient to reduce the saturation temperature thereof and to heat such to above said saturation temperature; the improvement whereby to increase the grain size of said granular adducts prior to filtering such, which comprises adding a direct heat increasing medium to said hydrocarbon oil-granular adduct mixture whereby to increase the temperature thereof about 3 to 10° C. to a temperature of about 30 to 35° C. prior to filtering such.

2. Process according to claim 1 wherein said medium is chlorinated hydrocarbon.

3. Process according to claim 2 wherein said oil solvent is methylene chloride.

4. Process according to claim 1 wherein relatively small amounts of water are additionally introduced into said mixture.

5. Process according to claim 1 wherein said temperature elevation is regulated to provide a urea adduct having a grain diameter of 0.1 to 0.6 mm.

6. Process according to claim 1 wherein said adduct mixture was prepared by contacting a paraffin containing hydrocarbon oil fraction with an aqueous solution of urea having a saturation of 70° C.

7. Process according to claim 1 wherein said urea adduct is separated from said mixture by sieving.

8. Process according to claim 7 wherein said urea adduct is decomposed to form a bi-phasic mixture of urea solution and paraffinic hydrocarbon.

9. Process according to claim 1 wherein said mixture of granular adduct, hydrocarbon oil and oil solvent, is caused to be agitated by the introduction of said medium in vapor form.

10. Process as claimed in claim 9 wherein said vaporous direct heat exchange agent agitates said mixture by being introduced from below the level of said mixture.

References Cited

UNITED STATES PATENTS

| | | | |
|---|---|---|---|
| 2,999,857 | 9/1961 | Hoppe | 260—96.5 |
| 3,071,534 | 1/1963 | Hoppe et al. | 208—25 |
| 3,117,923 | 1/1964 | Franz et al. | 208—25 |

FOREIGN PATENTS

| | | | |
|---|---|---|---|
| 822,780 | 10/1959 | Great Britain | 208—25 |

HERBERT LEVINE, Primary Examiner

U.S. Cl. X.R.

208—308; 260—96.5